(12) United States Patent
Venugopalachary et al.

(10) Patent No.: US 8,103,311 B1
(45) Date of Patent: Jan. 24, 2012

(54) OMNI-DIRECTIONAL ANTENNA SUPPORTING SIMULTANEOUS TRANSMISSION AND RECEPTION OF MULTIPLE RADIOS WITH NARROW FREQUENCY SEPARATION

(75) Inventors: Rajendran Venugopalachary, Cupertino, CA (US); Senthil Palanisamy, Cupertino, CA (US); Srinath Sarang, Cupertino, CA (US); Vaduvur Bharghavan, Morgan Hill, CA (US)

(73) Assignee: Meru Networks, Sunnyvale, CA (US)

( * ) Notice: Subject to any disclaimer, the term of this patent is extended or adjusted under 35 U.S.C. 154(b) by 719 days.

(21) Appl. No.: 12/134,105

(22) Filed: Jun. 5, 2008

Related U.S. Application Data

(63) Continuation of application No. 11/294,673, filed on Dec. 5, 2005.

(51) Int. Cl.
*H04M 1/00* (2006.01)
(52) U.S. Cl. .................... 455/562.1; 455/575.7; 455/82; 455/83; 455/121; 455/193.1
(58) Field of Classification Search ............... 455/562.1, 455/575.7, 82–83, 121, 193.1
See application file for complete search history.

(56) References Cited

U.S. PATENT DOCUMENTS

| 3,956,749 | A | * | 5/1976 | Magorian ..................... 342/147 |
| 5,038,151 | A | | 8/1991 | Kaminski |
| 5,125,108 | A | * | 6/1992 | Talwar ....................... 455/278.1 |
| 5,966,094 | A | | 10/1999 | Ward et al. |
| 6,788,658 | B1 | | 9/2004 | Bims |
| 6,933,909 | B2 | | 8/2005 | Theobold |
| 6,978,158 | B2 | | 12/2005 | Ghavami |
| 7,171,215 | B2 | | 1/2007 | Khouaja et al. |
| 7,197,308 | B2 | | 3/2007 | Singhal et al. |
| 7,277,728 | B1 | * | 10/2007 | Kauhanen ..................... 455/561 |
| 7,319,685 | B2 | | 1/2008 | Kim et al. |
| 7,333,455 | B1 | | 2/2008 | Bolt et al. |
| 7,359,362 | B2 | | 4/2008 | King et al. |
| 7,400,604 | B2 | | 7/2008 | Lee et al. |
| 7,403,506 | B2 | | 7/2008 | Lee et al. |
| 7,406,319 | B2 | | 7/2008 | Kostic et al. |
| 7,430,397 | B2 | | 9/2008 | Suda et al. |
| 7,466,981 | B1 | | 12/2008 | Abdelhamid et al. |
| 7,515,909 | B2 | | 4/2009 | Jain et al. |
| 7,555,287 | B1 | | 6/2009 | Heinonen et al. |

(Continued)

FOREIGN PATENT DOCUMENTS

JP 2005311580 11/2005

(Continued)

OTHER PUBLICATIONS

Miaris et al. "On the base stations antenna system design for mobile communications." Electrical Engineering, 2006, vol. 88, pp. 157-163.

(Continued)

*Primary Examiner* — Wayne Cai
(74) *Attorney, Agent, or Firm* — Swernofsky Law Group PC (57) ABSTRACT

An omni-directional antenna supporting simultaneous transmission/reception, from the same AP, on multiple frequencies, allowing each AP to communicate using each possible frequency. Each AP multiplexes its outgoing signals onto its transmitting antenna, and de-multiplexes its incoming signals from its receiving antenna. The transmitting and receiving antennae are each substantially located in each other's NULL zone (or one is in the NULL zone of the other). The AP can transmit/receive on many distinct frequencies without needing more antennae.

4 Claims, 4 Drawing Sheets

U.S. PATENT DOCUMENTS

| | | |
|---|---|---|
| 7,826,426 B1 | 11/2010 | Bharghavan et al. |
| 2003/0162546 A1 | 8/2003 | Jordan |
| 2003/0206535 A1 | 11/2003 | Shpak |
| 2003/0207697 A1 | 11/2003 | Shpak |
| 2003/0207698 A1 | 11/2003 | Shpak |
| 2003/0207699 A1 | 11/2003 | Shpak |
| 2003/0236103 A1* | 12/2003 | Tamaki et al. ............ 455/552.1 |
| 2004/0063455 A1 | 4/2004 | Eran et al. |
| 2004/0121770 A1 | 6/2004 | Tigerstedt et al. |
| 2004/0156399 A1 | 8/2004 | Eran |
| 2004/0185904 A1* | 9/2004 | Yamakita ..................... 455/560 |
| 2005/0054370 A1 | 3/2005 | Shpak |
| 2005/0122919 A1 | 6/2005 | Touag |
| 2005/0152314 A1 | 7/2005 | Sun et al. |
| 2005/0195110 A1* | 9/2005 | Lin et al. ................ 343/700 MS |
| 2005/0220048 A1 | 10/2005 | Lee et al. |
| 2006/0025127 A1 | 2/2006 | Cromer et al. |
| 2006/0049987 A1* | 3/2006 | Herrick .................. 343/700 MS |
| 2006/0111112 A1 | 5/2006 | Maveddat |
| 2007/0014267 A1 | 1/2007 | Lam et al. |
| 2007/0213071 A1 | 9/2007 | Hwang |
| 2008/0102835 A1 | 5/2008 | Zhao et al. |
| 2008/0153497 A1 | 6/2008 | Kalhan |
| 2008/0165866 A1 | 7/2008 | Teo et al. |
| 2008/0212535 A1 | 9/2008 | Karaoguz et al. |
| 2008/0242305 A1 | 10/2008 | Kahlert et al. |
| 2008/0287130 A1 | 11/2008 | Laroia et al. |
| 2009/0022127 A1 | 1/2009 | Traynor et al. |
| 2009/0061873 A1 | 3/2009 | Bao et al. |
| 2009/0061879 A9 | 3/2009 | Gallagher et al. |
| 2009/0111472 A1 | 4/2009 | Promenzio |

FOREIGN PATENT DOCUMENTS

| | | |
|---|---|---|
| JP | 2006229972 | 8/2006 |

OTHER PUBLICATIONS

Habib et al. "Multi-Antenna Techniques for OFDM based WLAN." Proceedings of First International Conference on Next-Generation Wireless Systems, Jan. 2006, pp. 186-190.

Miura et al. "Study of array pattern tuning method using hybrid genetic algorithms for figure-8 satellite's earth station antenna." Asia-Pacific Microwave Conference Proceedings, 2000 (Abstract).

Amir. "Fast handoff for seamless wireless mesh networks." MobiSys '06, Jun. 19-22, 2006, pp. 83-95, ACM, Uppsala, Sweden.

Chen et al. "A seamless handoff mechanism for DHCP-Based IEEE 802.11 WLANS." IEEE Communications Letters, vol. 1, No. 8, Aug. 2007, pp. 665-667.

Cheung et al. "Network configurations for seamless support of CDMA soft handoffs between cell clusters." IEEE Journal on Selected Areas in Communications, vol. 15, no. 7, Sep. 1997, pp. 1276-1288.

Chui et al. "An Access point coordination system for improved VoIP/WLAN handover performance." IEEE 2006, pp. 501-505.

Fan et al. "Managing heterogeneous access networks." 32nd IEEE Conference on Local Computer Networks, IEEE 2007, pp. 651-658.

Huang et al. "Incorporating AP selection and call admission control for seamless handoff procedure." Proceedings of the International Conference on Computer and Communication Engineering 2008, pp. 823-826, 2008.

Huang et al. "SAP: Seamless authentication protocol for vertical handoff in heterogeneous wireless networks." Third International Conference on Quality of Service in Heterogeneous Wired/Wireless Networks. Aug. 7-9, 2006, ACM, Waterloo, ON, Canada, pp. 1-10.

IEEE. "Part 11: Wireless LAN Medium Access Control (MAC) and Physical Layer (PHY) specifications." IEEE Std 802.11-1997, vol. No. pp. i-445, Nov. 18, 1997.

IEEE. "Part 11: Wireless LAN Medium Access Control (MAC) and Physical Layer (PHY) specifications." IEEE Std 802.11, 1999 Edition (R2003), vol. No. pp. i-513, 2003.

KIST. "Instant handoffs for wireless infrastructure meshed networks," Proceedings of the 2008 Australasian Telecommunication Networks and Applications Conference, pp. 288-293, 2008.

Zhou et al. "A seamless handoff scheme for Mobile IP." IEEE Vehicular Technology Conference, 2006, vol. 2, pp. 927-931.

Liao et al. "Practical schemes for smooth MAC layer handoff in 802.11 wireless networks." Proceedings of the 2006 International Symposium on a World of Wireless, Mobile and Multimedia Networks, IEEE, pp. 1-10.

LV. "Intelligent seamless vertical handoff algorithm for the next generation wireless networks." Mobilware '08, Feb. 12-15, 2008, Innsbruck, Austria, pp. 1-10.

Wei et al. "Seamless handoff support in wireless mesh networks," IEEE 2006, pp. 1-8.

Manodham et al. "A Seamless handoff scheme with new AP module for wireless LANs support VoIP." Proceedings of the 2005 Symposium on Applications and the Internet, IEEE, 2006, pp. 1-6.

Murray et al. "Intelligent access and mobility management in heterogeneous wireless networks using policy." First International Workshop on Information and Communication Technologies, ACM, 2003, pp. 181-186.

Yaakob et al. "An integration of mobile motion prediction with dedicated solicitation message for seamless handoff provisioning in high speed wireless environment." 2008 International Conference on Electronic Design, Dec. 1-3, 2008, Pemand, Malaysia, pp. 1-5.

* cited by examiner

OMNI-DIRECTIONAL ANTENNA SUPPORTING SIMULTANEOUS TRANSMISSION AND RECEPTION OF MULTIPLE RADIOS WITH NARROW FREQUENCY SEPARATION

CROSS REFERENCE TO RELATED APPLICATION

This application is a continuation of prior U.S. patent application Ser. No. 11/294,673, filed Dec. 5, 2005, in the name of the same inventors.

BACKGROUND OF THE INVENTION

In wireless communication, devices send and receive messages without being physically coupled. Wireless devices can include portable computers, telephones, location sensors (such as those using GPS), and the like. Portable computers with wireless communication capability can be coupled to a computer network, such as the Internet or the World Wide Web. The IEEE 802.11 standard (including 802.11a, 802.11b, and 802.11g) is one known technique for coupling wireless devices to a computer network. In 802.11, wireless devices seek out and select "access points" (herein sometimes called "AP's"), which are themselves physically coupled, for computer communication, to at least a network controller. Each wireless device associates itself with a particular AP, with which it communicates. Each wireless device (which might be moving) determines from time to time if it has good communication with its associated AP, and whether it would have better communication with a different AP. Each AP might be coupled to a single device, a collection of devices, or to a computer network.

In any of these cases, the known art exhibits several problems.

A $1^{st}$ problem is that multiple wireless devices might contend for communication through the AP. This might constrict the wireless devices and AP's from using their full communication ability. This might cause some wireless devices to obtain more or better communication service than others. This might reduce the ability of AP's to provide QoS (quality of service) guarantees that are needed for some uses of wireless devices, such as VoIP (voice over Internet Protocol) and other voice or video applications.

A $2^{nd}$ problem is that handoff (deassociating a wireless device from a $1^{st}$ AP, and associating that wireless device with a $2^{nd}$ AP) can take substantial time in relation to the communication. Similar to the $1^{st}$ problem, this might constrict the wireless devices and AP's from using their full communication ability. Similar to the $1^{st}$ problem, this might reduce the ability of AP's to provide QoS guarantees that are needed for some uses of wireless devices, such as VoIP and other voice or video applications.

A $3^{rd}$ problem is that access points currently support only 1 or 2 channels and access points on different channels in the same frequency band typically cannot be co-located. If 2 channels are supported, they are in different frequency bands, i.e. one on 2.4 GHz and one on 5 GHz, to prevent cross-channel interference. Therefore, any handoff must be spatial, i.e., from a $1^{st}$ AP to a spatially separated $2^{nd}$ AP. For example, since access points must be kept at some minimum distance from each other, handoff from channel 1 to channel 6 on the same AP and location cannot occur. Spatial handoff is much more difficult to optimize than handing off across channels in the same location to a multi-frequency access point.

SUMMARY OF THE INVENTION

The invention includes a substantially omni-directional antenna, with which a wireless communication system can support simultaneous transmission and reception, from multiple radios from many AP's, on multiple frequencies. The multi-frequency access points of the present invention have one or multiple radios. Each radio might operate on a single narrow-band frequency, but the antenna includes a broadband antenna capable of multiplexing/de-multiplexing multiple frequencies. In a wireless communication system as further described in the Incorporated Disclosure, each AP is intended to be capable of communicating on each possible frequency, with the effect that wireless devices can access the wireless communication system using every frequency, everywhere.

The invention provides each radio of an AP this capability without any pair of radios of the AP interfering with each other's signals, using a pair of antennae, one for trans-mitting and one for receiving. In a substantially omni-directional region, each AP multiplexes its outgoing signals onto a transmitting antenna, and de-multiplexes its incoming signals from a receiving antenna. The transmitting antenna (or antennae if there is more than one substantially omni-directional, e.g., overlapping, antenna) and the receiving antenna are each substantially located in a NULL zone of each other's transmission/reception region. Alternatively, the transmit antenna can be in a NULL zone of the reception antenna, or the reception antenna can be in a NULL zone of the transmit antenna. This has the effect that the many radios of an AP can transmit and receive substantially simultaneously without interference, e.g., a radio of an AP can transmit while another radio of the AP can receive, on a relatively large number of distinct frequencies and without needing more than one transmitting antenna and one receiving antenna.

As described below, one set of preferred embodiments includes a single pair of transmitting antennae facing in opposite directions, adjacent to a single pair of receiving antennae also facing in opposite directions, with the effect that the transmitting antennae and the receiving antennae are each substantially located in a NULL zone of each other's transmission/reception region. This has the effect that the two radios of an AP can transmit and receive substantially simultaneously without interference, e.g., a radio of an AP can transmit while a second radio of the AP can receive, each using different frequencies. In this set of embodiments, the transmitting/receiving antennae each include a patch transmission/reception element. This set of embodiments also preferably uses separate transmitting/receiving antennae for two separate spectral zones IEEE 802.11 uses, one for channels in 2.4 GHz ISM band and one for channels in 5 GHz UNI-I, UNI-II and UNI-III bands.

As described below, another set of preferred embodiments includes a substantially omni-directional transmitting antenna (such as a polar antenna) disposed within a substantially surrounding set of substantially unidirectional receiving antennae (such as patch antennae forming a square or hexagon). This has the effect that the receiving antennae, being substantially unidirectional, do not receive signals sent from the transmitting antenna. (The transmitting antenna can "receive" signals directed to the receiving antennae; however, this typically does not matter because, typically, no receiving circuitry would be connected to the transmitting antenna.) In this set of embodiments, the transmitting antenna includes substantially polar transmitting elements, while the receiving antennae each include reception elements.

DETAILED DESCRIPTION OF THE PREFERRED EMBODIMENT

Generality of the Description

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that those structures or techniques would be preferred in all circumstances.

References to 1$^{st}$ reasons for using particular structures or techniques do not preclude other reasons or other structures or techniques, even if completely contrary, where circumstances would indicate that the 1$^{st}$ reasons and structures or techniques are not as compelling. In general, the invention includes those other reasons or other structures or techniques, especially where circumstances indicate they would achieve the same effect or purpose as the 1$^{st}$ reasons or structures or techniques.

After reading this application, those skilled in the art would see the generality of this description.

DEFINITIONS

The general meaning of each of these terms or phrases is intended to be illustrative, and in no way limiting.

The phrase "access point", the term "AP", and the like, generally refer to devices capable of wireless communication with mobile devices, and capable of wireline communication with other devices. In preferred embodiments, AP's communicate with external devices using a L2/L3 network. However, in the context of the invention, there is no particular requirement that AP's have an actual wireline communication link; AP's might communicate entirely wirelessly.

The phrase "multiple radio", and the like, generally refers to devices capable of wireless communication with mobile devices while using multiple antennae, frequencies, or both.

The phrase "L2/L3 network", and the like, generally refers to a communication network in which data packets are transmitted in accordance with the ISO/OSI model. In preferred embodiments, an L2 network includes a LAN, such as an Ethernet-type LAN, while an L3 network includes a packet-switched network, such as multiple LAN's coupled using bridges or routers. However, as noted below, in the context of the invention, where an L2/L3 network is described there is no particular requirement for any particular type of network, whether designated as an L2/L3 network or otherwise.

The phrases "mobile device", "wireless device", and the like, generally refer to devices capable of wireless communication with AP's. In preferred embodiments, wireless devices implement a wireless communication standard such as IEEE 802.11a, 11b, or 11g. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use inter-compatible communication standards.

The phrase "wireless communication", and the like, generally refers to radio communication in a region of spectrum allocated for that purpose, or for unlicensed use. In preferred embodiments, wireless communication includes a wireless communication standard such as IEEE 802.11a, 11b, or 11g. However, in the context of the invention, there is no particular requirement that wireless communication must necessarily (1) use radio spectrum, (2) use electromagnetic communication, or even (3) be entirely confined to untethered communication coupling.

System Elements

Figure 1:
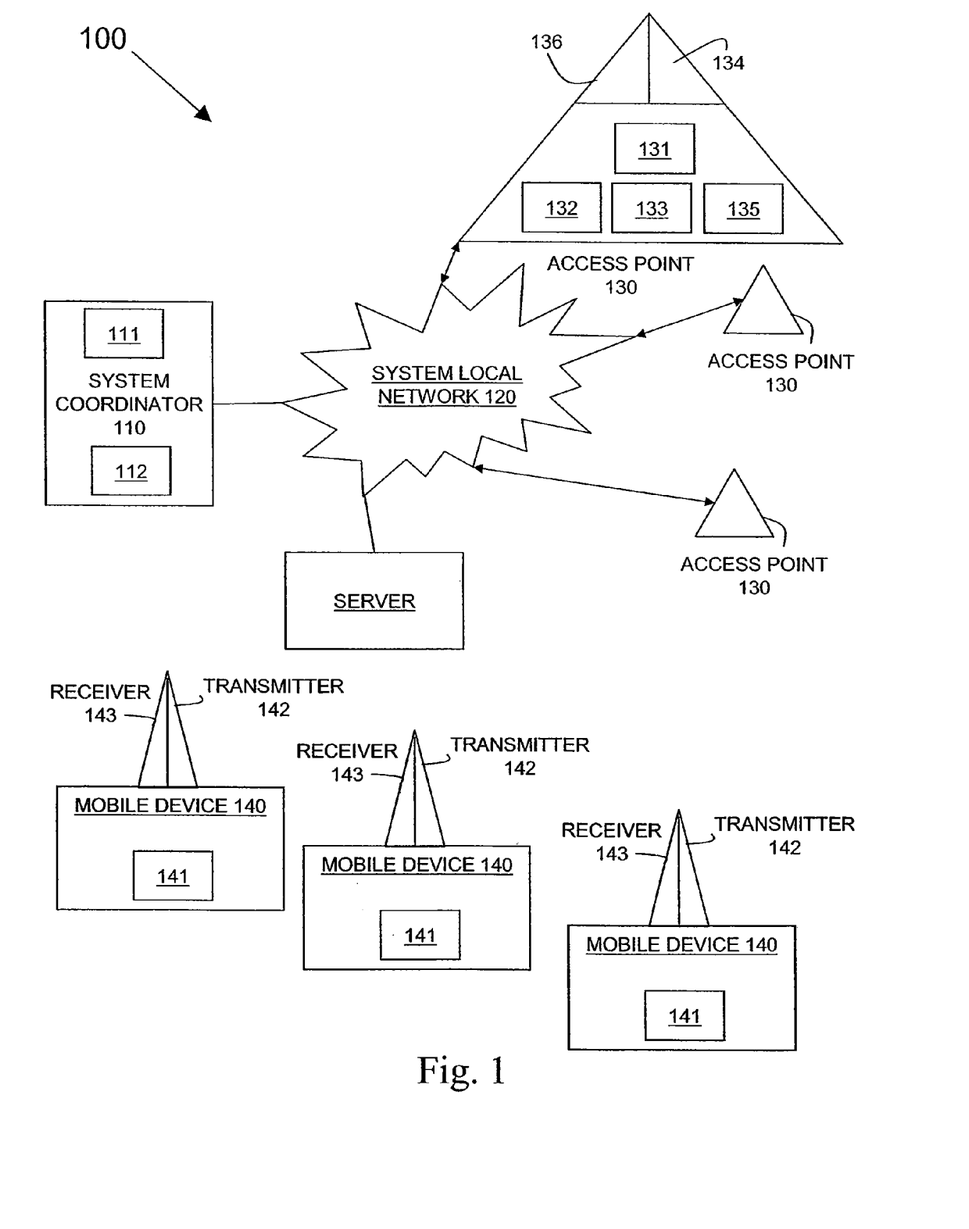
FIG. 1 shows a block diagram of a wireless communication system including access points and mobile devices.

FIG. 1 shows a block diagram of a wireless communication system including access points and mobile devices.

Communication System

One embodiment of a wireless communication system 100 includes elements shown in the figure, including at least a system coordinator 110, a system local network 120, a set of access points ("AP's") 130, and a set of mobile devices 140.

The system coordinator 110 includes elements shown in the figure, including at least a coordinator circuit in and a coordinator database 112. The coordinator circuit 111 includes a computing device, such as a processor, program and data memory, and optionally mass storage. In cases in which the coordinator circuit 111 includes a programmable computing device, it also operates under control of software, optionally distinguished as operating system software and application software. The coordinator database 112 includes information relating to the status of the system 100, its AP's 130, and its mobile devices 140. The coordinator circuit 111 operates with the coordinator database 112 to perform functions described below.

The system local network 120 includes any technique for sending and receiving information between the system coordinator no and the AP's 130. In a 1$^{st}$ set of preferred embodiments, the system local network 120 includes an L2/L3 network, capable of substantially reliably communicating data packets between the system coordinator no and the AP's 130. However, in the context of the invention, there is no particular requirement for using this technique.

Each mobile device 140 includes elements shown in the figure, including at least a device control circuit 141, a transmitter 142, and a receiver 143. In a 1$^{st}$ set of preferred embodiments, the device control circuit 141 includes a computing device preprogrammed to implement one or more of the IEEE 802.11a, 11b, or 11g protocols, and includes one or multiple radios. One example of a mobile device could be a telephone or mobile computer preprogrammed to operate in a wireless environment. However, in the context of the invention, there is no particular requirement that the device control circuit 141 must be preprogrammed; it may instead include programmable memory, data memory, and optionally mass storage. One example of this distinct type of mobile device could be a mobile computer programmable to discover its wireless environment and operate therein.

Access Points

In a preferred embodiment, each access point (AP) 130 includes elements shown in the figure, including at least an AP control circuit 131, an AP control database 132, a transmit multiplexer 133, a transmit antenna 134, a receive de-multiplexer 135, and a receive antenna 136.

The AP control circuit 131 includes a computing device, such as a processor, program and data memory, and optionally mass storage. In cases in which the AP control circuit 131 includes a programmable computing device, it also operates under control of software, optionally distinguished as operating system software and application software.

The AP control database 132 includes information relating to the status of the system 100, the particular AP 130, and those mobile devices 140 assigned to that AP 130. The AP control circuit 131 operates with the AP control database 132 to perform functions described below.

The AP control circuit 131 determines which signals it desires to send and on what frequencies, and sends that information to the transmit multiplexer 133. The transmit multiplexer 133 causes those signals to be multiplexed onto those frequencies and coupled to the transmit antenna 134 using one or more radios. This system allows clients to associate with one frequency, as well as allowing client devices that support "channel bonding", i.e., can support multiple frequencies simultaneously. After reading this application, those skilled in the art will realize that the transmit antenna 134 is capable of sending a multiplexed signal including information to be received at distinct mobile devices 140, each using its own receiving frequency.

The transmit antenna 134 transmits the multiplexed signal, substantially omnidirectionally, with the effect that all mobile devices 140 within reception range of the AP 130 will hear that signal.

The receive antenna 136 receives all signals communicated in the region local to the AP 130 (whether intended for the AP 130 or not), and couples those signals to the receive de-multiplexer 135 using one or more radios. After reading this application, those skilled in the art will realize that the receive antenna 136 is capable of receiving a signal that has been multiplexed by virtue of one or more of (1) a local AP 130 having sent a multiplexed signal, or (2) a set of distinct senders, possibly including either AP's 130, or mobile devices 140, or both, sending signals on multiple frequencies, which are then received as a multiplexed signal.

The receive de-multiplexer 135 causes the multiplexed signals from the receive antenna 136 to be separated into their frequency-modulated information components, and couples those information components to the AP control circuit 131.

After reading this application, those skilled in the art will realize that combined operation of the AP control circuit 131, the transmitter multiplexer 133, the transmit antenna 134, the receive de-multiplexer 135, and the receive antenna 136, have the effect that the AP 130 can transmit or receive on any of its available frequencies. It is desirable for the AP 130, when sending and receiving, to not have its own transmission interfere with its own reception.

Patch Transmit/Receive Antennae

Figure 2:
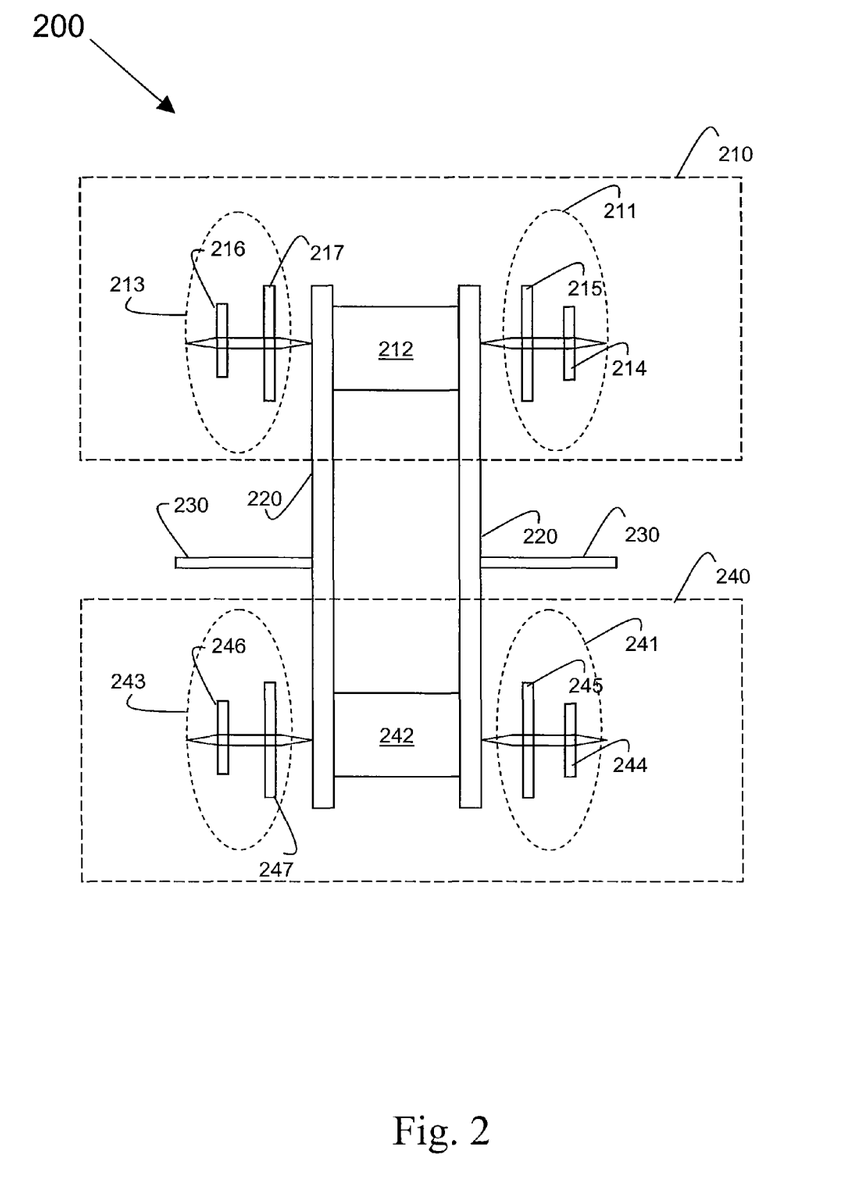
FIG. 2 shows a design diagram of a 1$^{st}$ antenna for use with a wireless communication system including access points and mobile devices.

FIG. 2 shows a design diagram of a $1^{st}$ antenna for use with a wireless communication system including access points and mobile devices.

In a $1^{st}$ set of preferred embodiments, an antennae assembly 200 includes a combined transmit antenna 210 and a combined receive antenna 240. The combined transmit antenna 210 includes a right transmit antenna 211 and a left transmit antenna 213 coupled to a transmit antennae combiner 212. In preferred embodiments, the right transmit antenna 211 further includes a 5 GHz patch antenna 214 and a 2.4 GHz patch antenna 215. Similarly, the left transmit antenna 213 further includes a 5 GHz patch antenna 216 and a 2.4 GHz patch antenna 217. The patch antennae might be sheet metal antennae, although this is not required.

The combined receive antenna 240 includes a right receive antenna 241 and a left receive antenna 243, coupled to a receive antenna combiner 242. In preferred embodiments, the right receive antenna 241 further includes a 5 GHz patch antenna 244 and a 2.4 GHz patch antenna 245. Similarly, the left receive antenna 243 further includes a 5 GHz patch antenna 246 and a 2.4 GHz patch antenna 247. The patch antennae might be sheet metal antennae, although this is not required.

A set of ground planes 220 might be shared by the antennae. A set of antennae isolators 230 preferably suppress cross-channel interference between the antennae.

In these embodiments, the combined transmit antenna 210 is placed in a NULL coverage zone of the combined receive antenna 240. Similarly, the combined receive antenna 240 is placed in a NULL coverage zone the combined transmit antenna 210. Alternatively, the transmit antenna can be in a NULL zone of the reception antenna, or the reception antenna can be in a NULL zone of the transmit antenna, which has a similar effect (i.e., the receive antenna cannot "hear" the transmit antenna).

Alternative Patch Transmit/Receive Antennae

After reading this application, those of ordinary skill will realize that each of the patch antennae, including the right transmit antenna 211, the left transmit antenna 213, the right receive antenna 241, and the left receive antenna 243, need not be constructed using only a single patch antenna. Any set of them, whether one of them, or several of them, or all of them, might be replicated, with the replicate disposed proximate to the original.

For one example, the antennae assembly 200 might include a right transmit antenna having two parts 211a and 221b, where each of those two parts are similar to the right transmit antenna 211 described above, and where those two parts are disposed proximate to each other. Similarly, the antennae assembly 200 might include a left transmit antenna similarly having two parts 213a and 213b, a right receive antenna having two parts 241a and 241b, and a left receive antenna having two parts 243a and 243b.

After reading this application, those of ordinary skill will realize that replication of one, some, or all of the patch antennae provides for antennae diversity, with the effect of providing support for 802.11n. In the context of the invention, there is no particular requirement that if one patch antenna is replicated, that any others need be.

Alternative Use of Transmit/Receive Antennae

The antennae assembly 200 might alternatively be used as an analog (or digital) signal repeater, with the effect of providing improved signal to noise ratio between an AP and a mobile device. More generally, the antennae assembly 200 might also be used as an analog (or digital) signal repeater, with the effect of providing improved signal to noise ratio between any sender(s) and receiver(s).

In an alternative use of the antennae assembly 200, the left receive antenna 243 receives signals, such as from an AP 130, couples those signals to a left-to-right amplifier 151, which amplifies those signals and couples them to the right transmit antenna 211, which transmits the amplified signals, such as to a mobile device 140. The left-to-right amplifier 151 might include an analog amplifier, which is preferred, or might include a digital receiver and retransmitter.

Similarly, the right receive antenna 241 receives signals, such as from a mobile device 140, couples those signals to a right-to-left amplifier 152, which amplifies those signals and couples them to the left transmit antenna 213, which transmits the amplified signals, such as to an AP 130. The right-to-left amplifier 153 might include an analog amplifier, which is preferred, or might include a digital receiver and retransmitter.

Omni-Directional Transmit, Patch Receive Antennae

Figure 3:
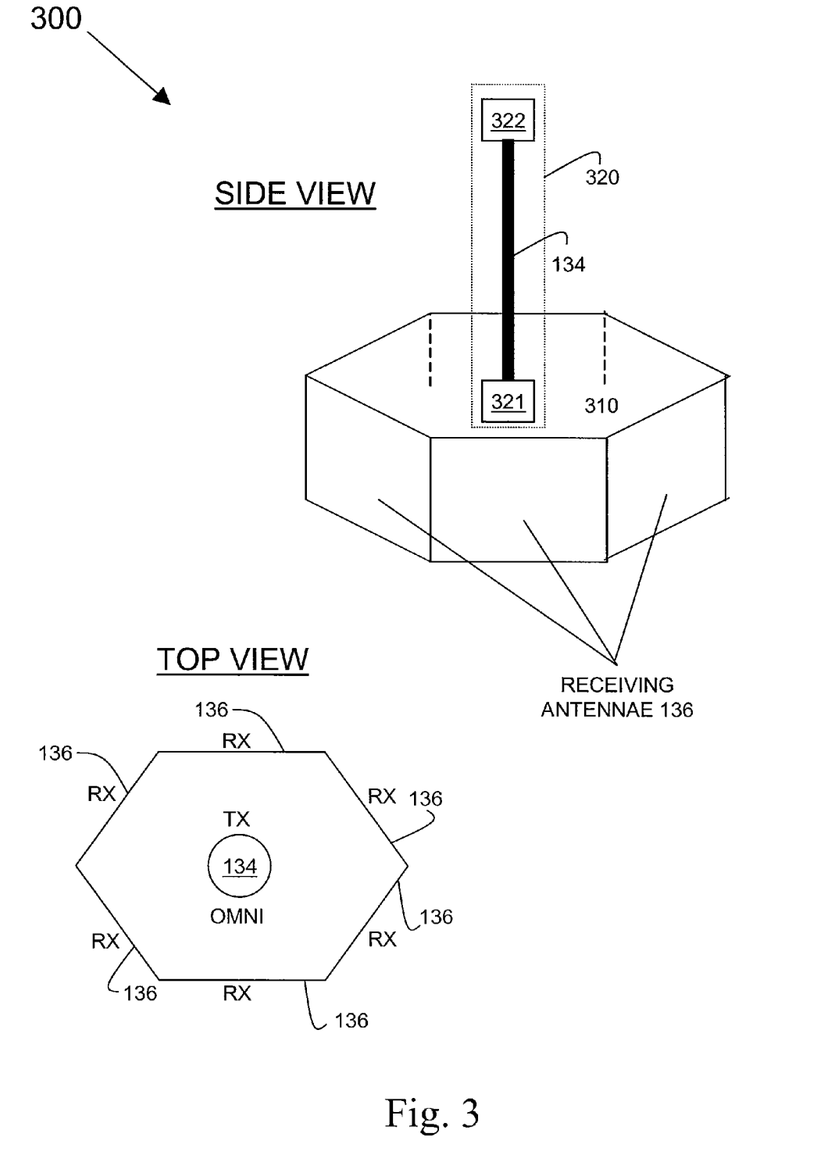
FIG. 3 shows a design diagram of a 2$^{nd}$ antenna for use with a wireless communication system including access points and mobile devices.

FIG. 3 shows a design diagram of a $2^{nd}$ antenna for use with a wireless communication system including access points and mobile devices.

In a $2^{nd}$ set of preferred embodiments, an assembly 300 of the transmit antenna 134 and a set of receiving antennae 136 has greater radial symmetry. The assembly 300 includes the transmit antenna 134, centrally disposed, and the set of receiving antennae 136, radially disposed with the effect of enclosing the transmit antenna 134 in a substantially enclosed region 310.

While the preferred embodiments describe omni-directional antennae, the present invention also supports directional antennae with flexible configurations for directional gain, azimuth, and vertical coverage patterns.

The transmit antenna 134 includes a substantially omni-directional transmitting antenna, such as a polar antenna 320 having a base 321 and a tip 322, and disposed within the enclosed region 310. An antenna isolator might be included and suppress cross-channel interference.

A substantially surrounding set of receiving antennae 136 define the enclosed region 310. This has the effect that the enclosed region 310 includes an interior 311, in which the transmit antenna 134 is disposed, and a substantially ring-shaped enclosure 312, the latter including the set of receiving antennae 136 disposed near each other.

The set of receiving antennae 136 each include a patch active plate, with the effect that the enclosure 312 receives those signals incoming to the assembly 300, and with the effect that the transmit antenna 134 does not receive those signals. Thus, the transmit antenna 134 is within a NULL zone for the set of receiving antennae 136.

Similarly, the transmit antenna 134 sends its signals through an inactive side of the receiving antennae 136, with the effect that the receiving antennae 136 do not receive those signals. Thus, the receiving antennae 136 are each within a NULL zone for the transmit antenna 134.

Alternatively, the transmit antenna can be in a NULL zone of the reception antenna, or the reception antenna can be in a NULL zone of the transmit antenna, which has a similar effect (i.e., the receive antenna cannot "hear" the transmit antenna).

Figure 4:
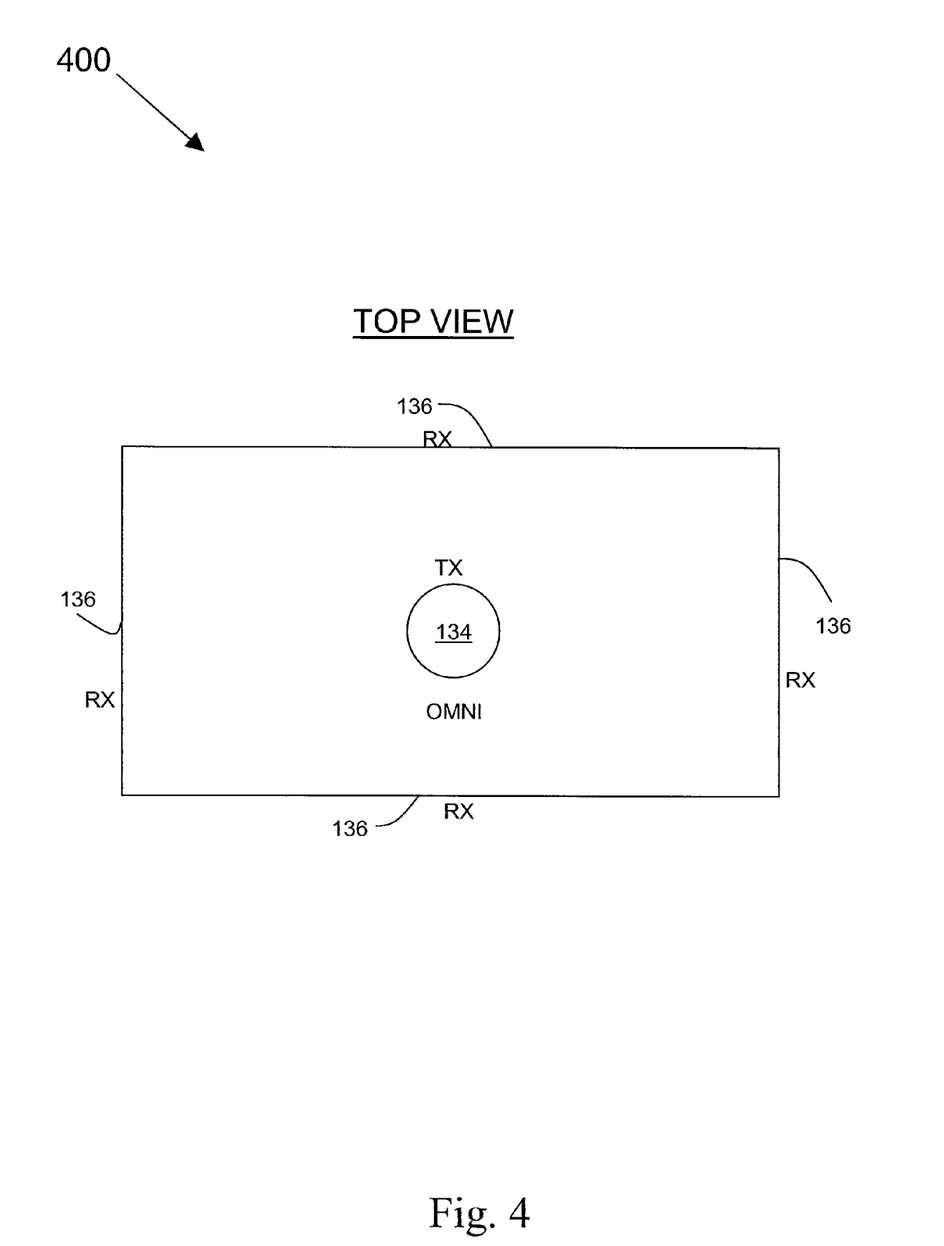
FIG. 4 shows a square variation of the antenna shown in FIG. 3.

The enclosure 312 might form any reasonable polygon; either a square or a hexagon is preferred. FIG. 3 shows an example of a square arrangement, and FIG. 4 shows an example of a square arrangement. The invention is not limited to these examples.

Dual Omni-Directional Transmit/Receive Antennae

In one embodiment, the AP control circuit 131 is a dual AP control circuit 131 that determines which signals it desires to send and on what frequencies, and sends to the transmit antenna 134 through two ports of the antenna. After reading this application, those skilled in the art will realize that the transmit antenna 134 is capable of sending two signals including information to be received at distinct mobile devices 140, each using its own receiving frequency.

The signals received by the receive antenna 136 may be received by the transmit antenna 134. The signals transmitted by the transmit antenna 134 are not received by the receive antenna 136. In one embodiment of the invention, the transmit antenna 134 is in a NULL zone of the receive antenna 136, but the receive antenna 136 is not in a NULL zone of the transmit antenna 134. In another embodiment, the antennae are in each other's NULL zone.

The transmit antenna 134 transmits the two signals, substantially omni-directionally, with the effect that all mobile devices 140 within reception range of the AP 130 will hear that signal.

The receive antenna 136 receives all signals communicated in the region local to the AP 130 (whether intended for the AP 130 or not). After reading this application, those skilled in the art will realize that the receive antenna 136 is capable of receiving a signal that has been multiplexed by virtue of either (1) a local AP 130 having sent a signal, or (2) a set of distinct senders, possibly including either AP's 130, or mobile devices 140, or both, sending signals on multiple frequencies, which are then received as a multiplexed signal.

After reading this application, those skilled in the art will realize that combined operation of the dual AP control circuit 131, the transmit antenna 134, and the receive antenna 136, have the effect that the AP 130 can transmit or receive on any two of its available frequencies. It is desirable for the AP 130, when sending and receiving, not to have its own transmission interfere with its own reception.

Co-Located Radio Deployment and Multi-Channel Planning

After reading this application, one skilled in the art will appreciate that the foregoing antennae permit co-location of radios, with plural co-located radios for an AP broadcasting or receiving on their own transmit and receive antennas in the same overall antenna. The isolation and NULL zones discussed above tends to limit interference between the radios.

In addition, after reading this application, one skilled in the art will appreciate that the foregoing antennae permit multi-channel planning, with radio(s) broadcasting on multiple channels co-located on the same overall antenna (including transmit and receive antennae). Thus, multiple channels for each frequency band (e.g., 2.4 GHz and 5.0 GHz) can be placed on each antenna. The same isolation and NULL zones that limit interference between radio bands likewise tends to limit interference between channels.

Non-Spatial Handoff

After reading this application, one skilled in the art will also appreciate that these antenna designs permit non-spatial handoff. In particular, these designs have the effect of permitting co-location of radios and channels, with the effect that handoff can occur within a spatial area service by a single AP, for example from one radio to another, from one band to another, or from one channel to another.

Collision Detection

After reading this application, one skilled in the art will further appreciate that these antenna designs have the effect of permitting collision detection within an area serviced by an AP. In particular, by "listening" to signals on co-located radios, bands, or channels, AP control circuit 131 can detect collisions that are likely to occur if a handoff occurs from one radio, band, or channel to another. In such case, the AP control circuit can take remedial action (e.g., changing a radio, band, or channel for a signal) before a collision occurs. An effect of this is that in some instances, problems associated with collisions can be avoided.

Generality of the Invention

This invention should be read in the most general possible form. This includes, without limitation, the following possibilities included within the scope of, or enabled by, the invention.

As described above, the invention provides an enabling technology, by which AP's have the capability to each use multiple frequencies, even to the extent where each AP uses each frequency.

- Communication throughput using AP's can be substantially increased, much closer to the maximum theoretical capacity in the case where each AP uses the entire available wireless spectrum.
- Handoff of wireless devices from a $1^{st}$ AP to a $2^{nd}$ AP can be substantially sped up, much closer to the minimum theoretical time for the system to find a superior AP for a moving wireless device, and to reassign that wireless device to a new AP.
- Handoffs between frequencies on a same access point are enabled.
- Alternative embodiments are also applicable to non-802.11 protocols, and are particularly useful in environments where the digital protocol involves commutativity of channels between transmitter and receiver.
- Alternative embodiments also apply to directional antennae and can support flexible antenna configurations, i.e., directional antennae, sectorized antennae, antennae with different azimuth patterns, antennae with different vertical patterns, and the like.
- Alternative embodiments provide for deployment of co-located AP's that support multiple frequencies. This has the effect of providing for better handoff, with the effect of making deployment much easier. Optimization occurs primarily across frequencies and not across both frequencies and substantially spatial distances.
- Alternative embodiments provide for simultaneous optimization of both peak and aggregate throughput; there is no requirement for frequency planning across access points.
- Alternative embodiments support different radios having different transmit power and receive power, with the effect of providing different coverage planning on different channels.
- Alternative embodiments provide for radios to perform collision detection in a broadcast wireless medium. With the 802.11 packet handshake detecting frame-level collision, the invention provides for reception on the same channel while transmitting, with the effect that recovery from collisions is relatively faster.
- Alternative embodiments provide for use of CSMA/CD protocols as well as CSMA/CA protocols.
- Alternative embodiments include 2 broadband antennae rather than N narrow-band antennae.
- Alternative embodiments provide for antennae that are deployed and coupled, e.g., using backhauling, to AP's that might be relatively non-local.

After reading this application, those skilled in the art would see the generality of this application.

The invention claimed is:

1. An access point, comprising:
   a combined transmit antenna including a first transmit antenna and a second transmit antenna facing in opposite directions and coupled to a transmit antenna combiner;
   a transmitter;
   a multiplexer coupled to the transmitter and to the combined transmit antenna;
   a combined receive antenna including a first receive antenna and a second receive antenna facing in opposite directions and coupled to a receive antenna combiner, said combined receive antenna facing 180 degrees opposite said combined transmit combiner and modulated using a substantially identical code;
   a receiver;
   a de-multiplexer coupled to the receiver and to the combined receive antenna; and
   a control circuit that determines what signals are transmitted on what frequencies via the transmitter, the multiplexer, and the combined transmit antenna and what signals are received on what frequencies via the receiver, the de-multiplexer, and the combined receive antenna;
   wherein the first transmit antenna, the second transmit antenna, the first receive antenna, and the second receive antenna each includes a 5 GHz patch antenna and a 2.4 GHz patch antenna;
   wherein the combined transmit antenna is located parallel to a maximum power reception region of said receive antenna in a null coverage zone of the combined receive antenna and the combined receive antenna is located parallel to said maximum power transmission region of said transmission antenna in a null coverage zone of the combined transmit antenna; and
   wherein the combined transmit antenna and the combined receive antenna co-locate multiple channels or channels and radios at the access point.

2. The access point as in claim 1,
   wherein the control circuit further directs collisions and possible collisions between signals on the reception antennae.

3. The access point as in claim 1,
   wherein the transmission antenna comprises polar elements.

4. A method, including steps of
   disposing as a combined receive antenna, a first one or more patch receive elements facing in substantially opposite directions from a second one or more patch receive elements;
   disposing as a combined transmit antenna, a first one or more patch transmit elements facing in substantially opposite directions from a second one or more patch transmit elements, said combined transmit antenna being disposed substantially 180 degrees opposite said combined receive antenna;
   receiving modulated signals on said combined receive antenna and retransmitting said modulated signals on said combined transmit antenna using a substantially interfering code, said steps of receiving and retransmitting substantially having the effect of furthering said modulated signals from a first wireless device on a first side of said combined receive antenna to a second wireless device on a second side of said combined transmit antenna;
   wherein said combined receive antenna is disposed parallel to a maximum power transmit region of said combined transmit antenna in a null coverage zone thereof, and said combined transmit antenna is disposed parallel to a maximum power receive region of said combined receive antenna in a null coverage zone thereof.

* * * * *